United States Patent Office 3,639,669
Patented Feb. 1, 1972

3,639,669
DEHYDROHALOGENATION OF
HALOTETRAHYDROPYRANS
Paul R. Stapp, Bartlesville, Okla., assignor to
Phillips Petroleum Company
No Drawing. Filed Mar. 24, 1969, Ser. No. 809,935
Int. Cl. C07d 7/08, 7/10
U.S. Cl. 260—345.1                    12 Claims

ABSTRACT OF THE DISCLOSURE

Dihydropyrans are formed by catalytic dehydrohalogenation of halotetrahydropyrans in the presence of an alkali metal halide.

This invention relates to catalytic dehydrohalogenation of halotetrahydropyrans. In another aspect this invention relates to the formation of dihydropyrans by catalytic dehydrohalogenation of halotetrahydropyrans.

Dihydropyrans are known to be useful compounds, particularly as starting materials for the manufacture of valuable chemicals. For example, British Pat. 558,106 discloses that dihydropyrans can be converted in the presence of Friedel-Crafts catalysts to both liquid and crystalline polymers. Such polymers are useful as lubricants and molding materials. Also, U.S. Pat. 2,448,260 discloses that polyvinyl alcohol and dihydropyran can be converted into polyvinyl tetrahydropyryl esters which are good adhesives for glass, wood, metal. In addition, U.S. Pat. 2,497,812 discloses that dihydropyrans can be hydrolyzed with water to yield 1,5-pentanediol. This latter compound is useful in the manufacture of polyester and urethane resins, hydraulic fluids, lube oil additives, and antifreeze.

One source of dihydropyrans is halotetrahydropyrans. It is known that 4-halotetrahydropyran can be converted to dihydropyran by contacting the 4-halotetrahydropyran with potassium hydroxide in refluxing 1,2 - ethanediol. This method was heretofore commercially undesirable because of the high cost of producing the 4-halotetrahydropyran and the expense of the caustic dehydrohalogenation reaction mixture. Recently a relatively inexpensive and commercially feasible process has been developed for producing 4 - halotetrahydropyrans. Therefore there is needed a relatively inexpensive and commercially feasible process for converting the 4-halotetrahydropyrans to dihydropyrans. I have now discovered that 4-halotetrahydropyrans, 2-halotetrahydropyrans and 3-halotetrahydropyrans can be converted to dihydropyrans at relatively low temperatures and at very high yields when a specific catalyst system is employed.

Thus an object of this invention is to provide a novel process for producing dihydropyrans. Another object of this invention is to provide a process for producing dihydropyrans by catalytic dehydrohalogenation of halotetrahydropyrans. Still another object of this invention is to provide an inexpensive and commercially feasible process for producing dihydropyrans.

Thus what I have discovered is that a halotetrahydropyran can be dehydrohalogenated to a dihydropyran in the presence of a catalyst comprising an alkali metal halide.

The halotetrahydropyrans which can be converted according to the process of this invention are represented with the following general formula:

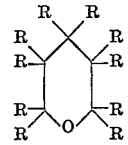

wherein one and only one R is a halogen, i.e., chlorine, fluorine, bromine, or iodine; wherein each remaining R is hydrogen or a hydrocarbyl radical such as alkyl, cycloalkyl, aryl, or combinations thereof such as alkaryl and aralkyl, containing in the range of 1 to 8 carbon atoms per R radical; wherein at least one R on at least one carbon atom adjacent to the carbon atom bonded to the halogen must be hydrogen; and wherein the total number of carbon atoms in the molecule does not exceed 17. The halotetrahydropyrans which contain in the range of 5 to 10 carbon atoms per molecule are generally preferred because of the ease by which they are converted. Particularly preferred are the chlorotetrahydropyrans containing in the range of 5 to 10 carbon atoms per molecule.

The halotetrahydropyrans of this invention can be synthesized by any method known in the art. One method of synthesizing halotetrahydropyrans is disclosed in Chemical Abstracts, 51, 1156–7 (1957).

Exemplary conversions of this invention can be represented as follows:

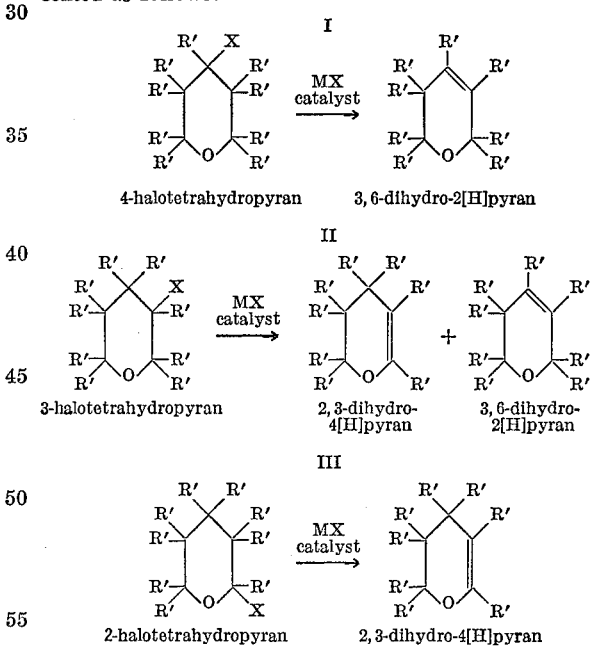

wherein X is a holagen such as chlorine, bromine, iodine, or fluorine, and wherein R' is hydrogen, or a hydrocarbyl radical comprising alkyl, cycloalkyl, aryl, or combinations thereof such as alkaryl and aralkyl, containing in the range of 1 to 8 carbon atoms per R' radical and where the total number of carbon atoms per molecule of halotetrahydropyran does not exceed 17.

Thus this invention enables one to convert either 2-halo-, 3-halo-, or 4-halotetrahydropyrans to the corresponding dihydropyrans with relative ease and in excellent yields.

Examples of suitable halotetrahydropyran compounds include:

2-chloro-, 3-chloro-, and 4-chlorotetrahydropyran,
2-bromo-, 3-bromo-, and 4-bromotetrahydropyran,
2-iodo-, 3-iodo-, and 4-iodotetrahydropyran,
2-fluoro-, 3-fluoro-, and 4-fluorotetrahydropyran,
4-chloro-3-methyltetrahydropyran,
4-chloro-2-methyltetrahydropyran,
4-chloro-2,3,6-tributyltetrahydropyran,
3-benzyl-4-chlorotetrahydropyran,
4-chloro-3-(2-methylcyclopentyl)tetrahydropyran,
2,6-dihexyl-4-fluorotetrahydropyran,
4-chloro-2,3,5,6-tetrapropyltetrahydropyran,
4-chloro-3-octyltetrahydropyran,
3-bromo-2-cyclohexyltetrahydropyran,
2-cyclopentyl-3-iodotetrahydropyran,
5-cyclooctyl-3-fluorotetrahydropyran,
5-cyclopentylmethyl-3-fluorotetrahydropyran,
2-chloro-6-(p-tolyl)tetrahydropyran,
2-bromo-5-(2,4-dimethylphenyl)tetrahydropyran,
2-bromo-4-cycloheptyl-6-methyltetrahydropyran,
4-chloro-2,2,3,3,4,5,6,6-octamethyltetrahydropyran, and the like, and mixtures thereof.

Exemplary dihydropyrans which can be produced according to the process of this invention include:

3,6-dihydro-2-[H]pyran,
3-methyl-3,6-dihydro-2-[H]pyran,
3-octyl-3,6-dihydro-2-[H]pyran,
5-methyl-3,6-dihydro-2-[H]pyran,
5-octyl-3,6-dihydro-2-[H]pyran,
2-butyl-3,6-dihydro-2-[H]pyran,
6-butyl-3,6-dihydro-2-[H]pyran,
2,3,6-tributyl-3,6-dihydro-2-[H]pyran,
2,5,6-tributyl-3,6-dihydro-2-[H]pyran,
3-benzyl-3,6-dihydro-2-[H]pyran,
5-benzyl-3,6-dihydro-2-[H]pyran,
3-(2-methylcyclopentyl)-3,6-dihydro-2-[H]pyran,
5-(2-methylcyclopentyl)-3,6-dihydro-2-[H]pyran,
2,6-dihexyl-3,6-dihydro-2-[H]pyran,
2,3,5,6-tetrapropyl-3,6-dihydro-2-[H]pyran,
3-octyl-3,6-dihydro-2-[H]pyran,
5-octyl-3,6-dihydro-2-[H]pyran,
2,3-dihydro-4-[H]pyran,
2-cyclohexyl-2,3-dihydro-4-[H]pyran,
2-cyclohexyl-3,6-dihydro-2-[H]pyran,
5-cyclooctyl-3,6-dihydro-2-[H]pyran,
5-cyclooctyl-2,3-dihydro-4-[H]pyran,
6-(p-tolyl)-2,3-dihydro-4-[H]pyran,
5-(2,4-dimethylphenyl)-2,3-dihydro-4-[H]pyran,
2,2,3,3,4,5,6,6-octamethyl-3,6-dihydro-2-[H]pyran, and
4-cycloheptyl-6-methyl-2,3-dihydro-4-[H]pyran.

The catalysts which I have discovered as suitable for dehydrohalogenating the halotetrahydropyrans can be any alkali metal halide having the formula: MX wherein M is a metal selected from the group consisting of the alkali metals (Group I–A of the Periodic Table) and X is a halogen (Group VII–A of the Periodic Table). The Periodic Table used in this instance appears in The Handbook of Chemistry and Physics (Chemical Rubber Co.), 45th edition (1964), page B–2. Examples of such suitable salts include potassium fluoride, potassium chloride, potassium bromide, potassium iodide, sodium chloride, sodium bromide, sodium fluoride, lithium fluoride, rubidium fluoride, cesium fluoride, lithium chloride, rubidium chloride, and the like, and mixtures thereof. Although I normally prefer to employ suitable diluents in combination with the halotetrahydropyran, it is also within the scope of this invention to employ the halotetrahydropyrans per se without added diluents. Suitable diluents are those that do not deleteriously affect the conversion of the invention. For example, diluents such as benzene, toluene, hexane, octane, cyclohexane, ethylene glycol, propylene glycol, tetrahydropyran, tetrahydrofuran, propanol, dioxane, and the like, can be employed if desired. Naturally, since the use of these diluents is not essential to the inventive process, their use is not a limiting feature of my process.

When a diluent is employed, it can comprise from about 1 wt. percent to about 95 wt. percent of the total mixture of diluent plus reactant (halotetrahydropyran). As with the diluent, the amount of catalyst employed is not believed to be critical. Therefore the catalyst can comprise from about 5 wt. percent to about 98 wt. percent of the reaction components (said components comprising reactant and catalyst, plus the diluent when it is employed).

Conventional batch type or continuous techniques can be employed to effect the conversion of this invention. One convenient mode of operation is to pass a halotetrahydropyran through a bed of the catalytic salt or salts of this invention and recover the dihydropyran by distillation. Of course, other means of operation can be employed. For instance, the alkali metal halide can be supported (as on alumina) and form an effective vapor phase dehydrohalogenation catalyst wherein the halotetrahydropyran passes through the catalyst bed in a vaporized form. Components can be charged in any convenient order to a suitable reaction chamber without significantly affecting the inventive process. The halotetrahydropyran is often added to the catalyst alone or to the catalyst and the diluent when the latter is employed.

Once the components are charged to a suitable reaction chamber, the temperature of the components can be brought to any suitable value within the range of from about 20° C. to about 250° C. This is usually accomplished by charging the ingredients to a preheated chamber or by heating the reaction chamber, or both. It is most convenient to employ a temperature at least as high as the boiling point of the particular dihydropyran desired since the reaction will then proceed at a fairly rapid rate and also since the product can then be easily removed by distillation. The pressure in the reaction chamber is not believed to be critical. Therefore atmospheric pressure is generally employed because of convenience, although either superatmospheric or subatmospheric pressures can be employed, normally within the range of from 0.5 to about 20 atmospheres. A reaction time sufficient to effect a desired degree of conversion is usually employed. Thus the reaction time may be as short as a minute and as long as many hours. A high conversion can usually be achieved in the period of from about 5 minutes to about 24 hours.

The operation of the process of this invention is aptly demonstrated by the following example:

EXAMPLE

A reactor was charged with 87 g. (1.5 moles) of anhydrous potassium fluoride and 500 ml. of ethylene glycol. The materials were distilled until 25 ml. of ethylene glycol was distilled off to insure dryness. A total of 120.5 g. (1.0 mole) of 4-chlorotetrahydropyran was then added. The material was then heated and product having a boiling point of 86–95° C. was distilled therefrom. The distillate recovered was determined to be 3,6-dihydro-2-[H]pyran by gas-liquid chromatography and infrared comparison with an authentic sample. A total of 79 g. of 3,6-dihydro-2-[H]pyran was recovered, which constituted a 94 mole percent yield based on the 4-chlorotetrahydropyran charged.

This example demonstrates the catalytic conversion of a halotetrahydropyran to a dihydropyran according to the process of this invention.

As will be evident to those skilled in the art, many variations and modifications of the invention can be practiced in view of the foregoing disclosure without departing from the spirit and scope of the invention.

I claim:
1. A process for producing a dihydropyran from a halotetrahydropyran which comprises contacting a halotetrahydropyran compound of the formula:

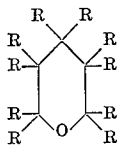

wherein one and only one R is a halogen and each remaining R is hydrogen or a hydrocarbyl radical selected from the group consisting of alkyl, cycloalkyl, aryl, alkyl-substituted cycloalkyl, cycloalkyl-substituted alkyl, alkaryl and aralkyl, containing in the range of 1 to 8 carbon atoms per R radical; wherein at least one R on at least one carbon atom adjacent to the carbon atom bonded to the halogen must be hydrogen; and wherein the total number of carbon atoms in the molecule does not exceed 17; with a catalyst consisting essentially of at least one salt of the following formula:

MX wherein M is an alkali metal and X is a halogen;
said contacting occurring at a temperature in the range of from about 20° C. to about 250° C., thereby forming one or more dihydropyrans.

2. A process according to claim 1 wherein said halotetrahydropyran is 4-halotetrahydropyran and said dihydropyran formed is 3,6-dihydro-2-[H]pyran.

3. A process according to claim 1 wherein said halotetrahydropyran is 3-halotetrahydropyran and the dihydropyrans formed are 2,3-dihydro-4-[H]pyran and 3,6-dihydro-2-[H]pyran.

4. A process according to claim 1 wherein said halotetrahydropyran is 2-halotetrahydropyran and said dihydropyran formed is 2,3-dihydro-4-[H]pyran.

5. A process of claim 1 wherein said contacting in said temperature range occurs for a period of about 5 minutes to about 24 hours.

6. A process of claim 1 wherein the catalyst comprises from about 5 to about 98 weight percent of the reaction components.

7. A process of claim 1 wherein said process is conducted in the presence of a diluent.

8. A process of claim 1 wherein said catalyst is selected from the group consisting of potassium fluoride, potassium chloride, potassium bromide, and potassium iodide.

9. A process of claim 2 wherein said 4-halotetrahydropyran comprises 4-chlorotetrahydropyran.

10. A process of claim 9 wherein said catalyst is potassium fluoride.

11. A process of claim 3 wherein said 3-halotetrahydropyran comprises 3-bromotetrahydropyran.

12. A process of claim 4 wherein said 2-halotetrahydropyran comprises 2-chlorotetrahydropyran.

References Cited
UNITED STATES PATENTS
2,976,299   3/1961   Manly _____ 260—345.1

JOHN M. FORD, Primary Examiner